(12) United States Patent
Mitsuhashi et al.

(10) Patent No.: US 9,051,840 B2
(45) Date of Patent: Jun. 9, 2015

(54) WALL OF TURBO MACHINE AND TURBO MACHINE

(75) Inventors: Katsunori Mitsuhashi, Tokyo (JP); Akira Takahashi, Kawasaki (JP); Hiroshi Hamazaki, Iruma (JP); Ruriko Yamawaki, Iruma (JP)

(73) Assignees: IHI CORPORATION (JP); THE SOCIETY OF JAPANESE AEROSPACE COMPANIES (JP)

( * ) Notice: Subject to any disclaimer, the term of this patent is extended or adjusted under 35 U.S.C. 154(b) by 1159 days.

(21) Appl. No.: 12/593,072

(22) PCT Filed: Mar. 28, 2008

(86) PCT No.: PCT/JP2008/056181
§ 371 (c)(1),
(2), (4) Date: Nov. 25, 2009

(87) PCT Pub. No.: WO2008/120748
PCT Pub. Date: Oct. 9, 2008

(65) Prior Publication Data
US 2010/0172749 A1 Jul. 8, 2010

(30) Foreign Application Priority Data
Mar. 29, 2007 (JP) ................ P2007-087337

(51) Int. Cl.
*F01D 5/14* (2006.01)
*F04D 29/32* (2006.01)
(Continued)

(52) U.S. Cl.
CPC *F01D 5/143* (2013.01); *F04D 1/10* (2013.01); *F04D 13/14* (2013.01); *F04D 23/008* (2013.01);
(Continued)

(58) Field of Classification Search
CPC . F01D 5/143; F05D 2240/11; F05D 2240/80; F05D 2250/184; F05D 2250/611; F04D 29/324; F04D 29/522
USPC ............ 415/191, 208.1, 208.2, 209.4, 210.1, 415/914; 416/189, 192, 193 R, 193 A, 234, 416/DIG. 2
See application file for complete search history.

(56) References Cited

U.S. PATENT DOCUMENTS 4,012,165 A   3/1977   Kraig
4,420,288 A * 12/1983  Bischoff ............ 416/244 A
(Continued)

FOREIGN PATENT DOCUMENTS

EP   1 182 328 A2   2/2002
EP   1 326 005 A2   7/2003
(Continued)

OTHER PUBLICATIONS

Office Action issued in corresponding Japanese Patent Application No. 2007-087337 dated May 24, 2011 with English translation (11 pages).
(Continued)

*Primary Examiner* — Edward Look
*Assistant Examiner* — Jesse Prager
(74) *Attorney, Agent, or Firm* — Ostrolenk Faber LLP

(57) ABSTRACT

The invention relates to wall of a turbo machine having a cascade of blades. The wall includes: a first platform facing a first passage between blades in the cascade of blades; and a second platform facing a second passage between adjacent cascade of blades on an upstream side and cascade of blades on a downstream side, and having a circumferential outline having a distribution of radial positions. According to the invention, loss due to disturbance of flow through the gap of axially adjacent walls can be reduced.

15 Claims, 12 Drawing Sheets

(51) Int. Cl.
*F04D 29/52* (2006.01)
*F04D 1/10* (2006.01)
*F04D 13/14* (2006.01)
*F04D 23/00* (2006.01)

(52) U.S. Cl.
CPC ......... *Y02T 50/673* (2013.01); *F05D 2250/184* (2013.01); *F05D 2250/611* (2013.01); *F05D 2250/711* (2013.01); *F05D 2240/11* (2013.01); *F05D 2240/80* (2013.01)

(56) References Cited

U.S. PATENT DOCUMENTS

| | | | |
|---|---|---|---|
| 5,466,123 A * | 11/1995 | Rose | 415/182.1 |
| 6,416,289 B1 | 7/2002 | Ramesh et al. | |
| 6,511,294 B1 | 1/2003 | Mielke et al. | |
| 6,524,070 B1 * | 2/2003 | Carter | 416/193 A |
| 6,561,761 B1 | 5/2003 | Decker et al. | |
| 7,465,155 B2 * | 12/2008 | Nguyen | 416/193 R |
| 7,625,181 B2 * | 12/2009 | Matsuda et al. | 416/193 A |
| 2003/0170124 A1 | 9/2003 | Staubach et al. | 416/193 |
| 2006/0233641 A1 | 10/2006 | Lee et al. | 415/208.1 |
| 2006/0269399 A1 | 11/2006 | Girgis et al. | 415/115 |
| 2009/0232650 A1 * | 9/2009 | Suciu et al. | 415/207 |

FOREIGN PATENT DOCUMENTS

| | | |
|---|---|---|
| EP | 1 515 000 A1 | 3/2005 |
| EP | 1 688 586 A1 | 8/2006 |
| EP | 1 760 257 A1 | 3/2007 |
| JP | 2001-271792 A | 10/2001 |
| JP | 2003-106106 | 4/2003 |
| JP | 2003-269384 A | 9/2003 |
| JP | 2004-084539 | 3/2004 |
| JP | 2004-100578 | 4/2004 |
| JP | 2005-194914 | 7/2005 |
| JP | 2005-240727 | 9/2005 |
| JP | 2006-291949 A | 10/2006 |
| WO | WO 2005042925 A1 * | 5/2005 |
| WO | WO 2006/033407 A1 | 3/2006 |

OTHER PUBLICATIONS

International Search Report dated May 13, 2008, issued in corresponding international application No. PCT/JP2008/056181.
Decision for Dismissal of Amendment dated Feb. 19, 2013 issued in corresponding Japanese Patent Application No. 2007-087337 with English translation.
European Search Report with a mailing date of Sep. 20, 2013 issued in corresponding European Patent Application No. 08739299.9 (8 pages).

* cited by examiner

WALL OF TURBO MACHINE AND TURBO MACHINE

CROSS REFERENCE TO RELATED APPLICATIONS

The present application is a 35 U.S.C. §371 National Phase conversion of PCT/JP2008/056181, filed Mar. 28, 2008, which claims benefit of Japanese Application No. 2007-087337, filed Mar. 29, 2007, the disclosure of which is incorporated herein by reference. The PCT International Application was published in the Japanese language.

TECHNICAL FIELD

The present invention relates to wall of a turbo machine that faces a passage, and to a turbo machine.

BACKGROUND ART

In a turbo machine having a row of stator blades and a row of rotor blades, the passage between the blades is surrounded by a wall on the radial inside and a wall on the radial outside (referred to as platforms, bands, shrouds or the like). The working fluid flowing out from the passage between blades of one blade row flows into the passage between blades of the next adjacent blade row. A gap is provided between the wall pair of axially adjacent blade rows (for example, refer to Patent Document 1). The presence of the gap tends to cause a turbulence of the flow close to the wall surface.
[Patent Document 1] U.S. Pat. No. 6,416,289 (FIG. 6)

DISCLOSURE OF INVENTION

Problems to be Solved by the Invention

An object of the present invention is to reduce the loss due to turbulence of flow through the gap of axially adjacent walls.

Means for Solving the Problem

A first aspect of the present invention provides a wall of a turbo machine having a cascade of blades including: a first platform facing a first passage between blades in the cascade of blades, and a second platform facing a second passage between another adjacent cascade of blades on an upstream side and the cascade of blades on a downstream side, and having a circumferential outline having a distribution of radial positions.

A second aspect of the present invention provides a wall of a turbo machine having a cascade of blades including: a first platform having a first radial face arranged between a leading edge and a trailing edge of the blades in the cascade of blades; and a second platform having a second radial face arranged between the blades of the cascade of blades and blades of another adjacent cascade of blades, and that cooperates with the first radial face of the first platform, and in which a circumferential shape of the second radial face has a distribution of radial positions.

A third aspect of the present invention provides a turbo machine including; a stator blade, a rotor blade, a wall on a root side of the stator blade, a wall on a tip side of the stator blade, a wall on a root side of the rotor blade, and a wall on a tip side of the rotor blade, and at least one of the walls has a wall according to the first or second aspects.

A fourth aspect of the present invention provides a turbo machine including; a stator blade, a rotor blade, a first wall on a tip side of the stator blade, a second wall on a tip side of the rotor blade, a third wall on a root side of the stator blade, a fourth wall on a root side of the rotor blade; and
an extension provided on at least one of the first wall, the second wall, the third wall, and the fourth wall, and extending from a leading edge of a stator blade or a rotor blade towards a first clearance space between adjacent first wall and second wall, or a second clearance space between adjacent third wall and fourth wall, and having a radial depression.

A fifth aspect of the present invention provides a turbo machine including; a stator blade, a rotor blade, a first wall on a tip side of the stator blade, a second wall on a tip side of the rotor blade, a third wall on a root side of the stator blade, a fourth wall on a root side of the rotor blade; and an extension provided on at least one of the first wall, the second wall, the third wall, and the fourth wall, and extending from a leading edge of a stator blade or a rotor blade towards a first clearance space between adjacent first wall and second wall, or a second clearance space between adjacent third wall and fourth wall, and having a depression that suppresses loss of flow between the first clearance space or the second clearance space and a passage between blades.

Examples of the turbo machine include for example; a turbo fan engine, a turbo jet engine, a turbo propeller engine, a turbo shaft engine, a turbo ram jet engine, a gas turbine for power generation, and a ship propulsion gas turbine.

EFFECTS OF THE INVENTION

According to the present invention, loss due to turbulence of flow through the gap of axially adjacent walls can be reduced.

BRIEF DESCRIPTION OF THE DRAWINGS

FIG. 1 is a schematic cross-sectional view showing a gas turbine engine used in an aircraft or the like.

BRIEF DESCRIPTION OF THE REFERENCE SYMBOLS 10, 11, 12, 13 ... rotor (base), 14 ... blade (rotor blade), 15, 16, 17, 18 ... casing (base), 19 ... blade (stator blade), 20 ... leading edge, 21 ... trailing edge, 23 ... front surface (P.S.), 24 . . . rear surface (S.S.), 31 . . . wall, 71 to 78 . . . extension (second platform), 80 . . . first platform, 81 . . . first radial face, 82 . . . second radial face, 83 . . . outside face, 84 . . . third radial face, 90 . . . depression, 91 . . . depression part, 100 . . . working fluid, 101, 102 . . . cascade of blades, 111, 112, 113 . . . passage, 121, 122 . . . clearance space

BEST MODE FOR CARRYING OUT THE INVENTION

Figure 1:
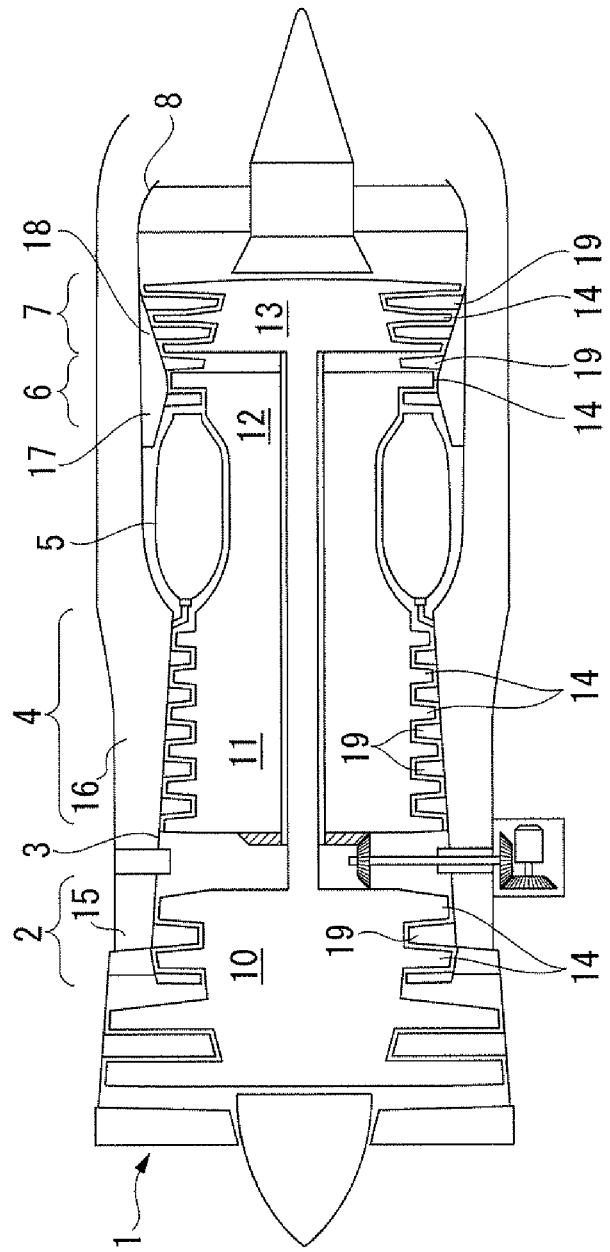

FIG. 1 is a schematic cross-sectional view showing a gas turbine engine (turbo fan engine) used in an aircraft or the like. The gas turbine engine includes; an air inlet 1, a fan low pressure compressor 2, a fan air outlet duct 3, a high pressure compressor 4, a combustion chamber 5, a high pressure turbine 6, a low pressure turbine 7, an exhaust duct 8 or the like.

The fan low pressure compressor 2, the high pressure compressor 4, the high pressure turbine 6, and the low pressure turbine 7, each include a rotor with a plurality of blades (rotor blades) 14 on the outer periphery of rotators 10, 11, 12, and 13 serving as bases, arranged spaced apart from each other in the circumferential direction, and a nozzle in which a plurality of blades (stator blades) 19 are arranged space apart from each other in the circumferential direction on an inner periphery of annular casings 15, 16, 17, and 18 serving as bases.

The plurality of blades 14 extend outward from the rotators 10, 11, 12, and 13. The plurality of blades 19 extend inward from the casings 15, 16, 17, and 18. Between the rotators 10, 11, 12, and 13 and the corresponding casings 15, 16, 17, and 18 are formed annular passages (axial flow paths).

In the fan low pressure compressor 2 and the high pressure compressor 4, the pressure of the working fluid is increased with the flow of the working fluid along the axial flow path. In the high pressure turbine 6 and the low pressure turbine 7, the pressure of the working fluid is reduced with the flow of the working fluid along the axial flow path.

The peripheral wall on the root (hub) side of the rotor blades 14 is a radial inner wall in the axial flow passage, and the peripheral wall on the root (hub) side of the nozzle blades 19 is a radial outer wall in the axial flow passage.

In the case where a peripheral wall is provided on the distal (tip) side of the rotor blades 14, the wall on the tip side is a wall on the radial outside in the axial flow passage. In the case where a peripheral wall is provided in the distal (tip) side of the nozzle blades 19, the wall on the tip side is a wall on the radial inside in the axial flow passage.

The wall according to the present invention is also applicable to any of; the wall on the root side of the rotor blades 14, the wall on the tip side of the rotor blades 14, the wall on the root side of the nozzle blades 19, or the wall on the tip side of the nozzle blades 19.

Figure 2:
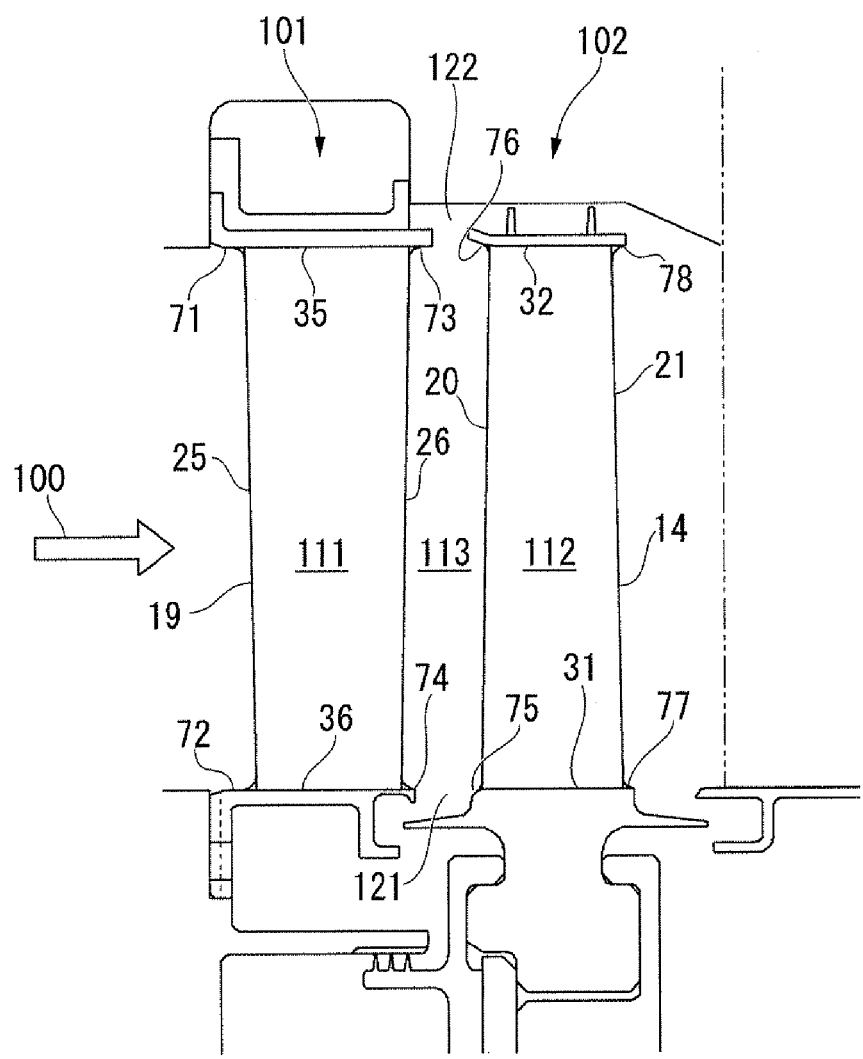
FIG. 2 is a local sectional view showing adjacent cascades of blades.

FIG. 2 is a local sectional view showing a cascade of blades 101 having blades (stator blades) 19, and a cascade of blades 102 having blades (rotor blades) 14, which are adjacent along the axial direction.

As shown in FIG. 2, a passage 111 (first passage) between the blades 19 of the cascade of blades 101, is between a leading edge 25 and a trailing edge 26 of the nozzle blades 19 along the axial direction, and is between a wall 35 on the radial outside being the root side of the nozzle blades 19 along the radial direction, and a wall 36 on the radial inside being the tip side of the nozzle blades 19. A passage 112 (first passage) between the blades 14 of the cascade of blades 102, is between the leading edge 20 and the trailing edge 21 of the blades 14 along the axial direction, and is between a wall 31 on the radial inside being the root side of the blades 14 along the axial direction, and a wall 32 on the radial outside being the tip side of the blades 14. The working fluid 100 flows at least in the axial direction of the engine in the sequence of; the passage 111, a passage 113, and the passage 112.

In the present embodiment, the wall 35 and the wall 36 of the cascade of blades 101 have extensions 71 and 72 extending at least axially forward from the leading edge 25 of the blades 19, and extensions 73 and 74 extending at least axially rearward from the trailing edge 26 of the blades 19. The wall 31 and the wall 32 of the cascade of blades 102 have extensions 75 and 76 extending at least axially forward from the leading edge 20 of the blades 14, and extensions 77 and 78 extending at least axially rearward from the trailing edge 21. Between the radially inward extensions 74 and 75 there is provided a clearance space 121, and between the radially outward extensions 73 and 76 there is provided a clearance space 122.

Figure 3:
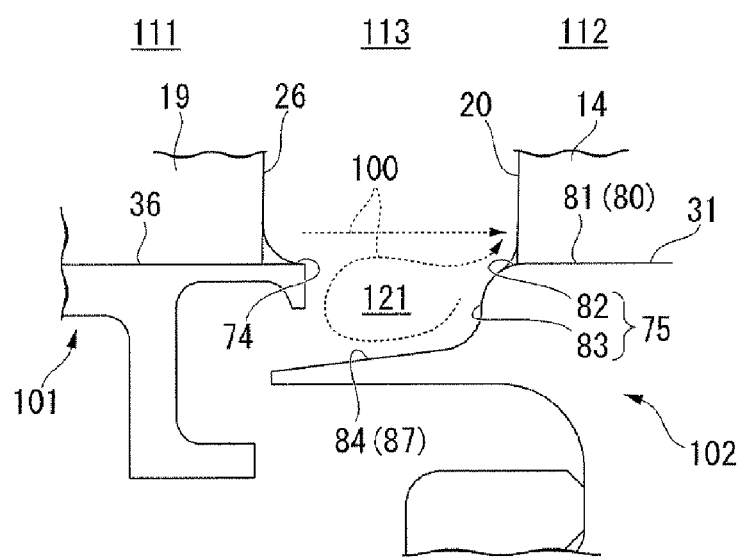
FIG. 3 is a view showing a gap between adjacent walls.

FIG. 3 is a view showing a gap between the walls 36 and 31 of the adjacent cascade of blades 101 and 102. As shown in FIG. 3, the wall 31 of the cascade of blades 102 has a first radial face 81, a second radial face 82, and an outside face 83. Here the radial faces are faces that at least face the radial direction of the engine. In the present embodiment, the first and second radial faces 81 and 82 have a part of an outer peripheral face in the peripheral wall on the root side of the rotor blades 14. The first radial face 81 is provided on a first platform 80 that is located between the leading edge 20 and the trailing edge 21 of the blades 14, and faces the passage 112 between the blades 14 of the cascade of blades 102. The second radial face 82 is provided on a second platform (extension 75) that extends forward from the leading edge 20 of the blades 14, and faces the passage 113 (second passage) between the cascade of blades 102 and the adjacent cascade of blades 101. The outside face 83 faces axially forward of the cascade of blades 102, and is located on the axial front end of the platform (75, 80) of the blades 14. A curved surface (and/or inclined surface) is provided as required on the corner between the second radial face 82 and the outside face 83.

Furthermore, in FIG. 3, the wall 31 has a seal portion 87 that extends axially further from the outside face 83 of the extension 75. On the seal portion 87 there is provided a third radial face 84 that faces the passage 113 between the adjacent cascade of blades 101 and 102. As at least a wall face of the axial flow passage, the second radial face 82 cooperates with the first radial face 81, and the outside face 83 cooperates with the second radial face 82, and the third radial face 84 cooperates with the outside face 83. These faces, as required, can also cooperate as wall faces of a bleed air passage.

In the present embodiment, there is a difference in height along the radial direction between the second radial face 82 of the extension 75 and the third radial face 84 of the seal portion 87. The clearance space 121 between the wall 36 and the wall 31 has a cavity that is surrounded by the extension 74 of the wall 36, the extension 75 of the wall 31, and the seal portion 87. The existence of this clearance space 121 tends to cause turbulence in the flow close to the wall face of the cascade of blades 102 for example. In the present embodiment, the extension 75, as described below, has a radial depression that suppresses the loss (pressure loss, energy loss) in the flow from the clearance space 121 towards the passage 112 between the blades 14 of the cascade of blades 102.

Figure 4:
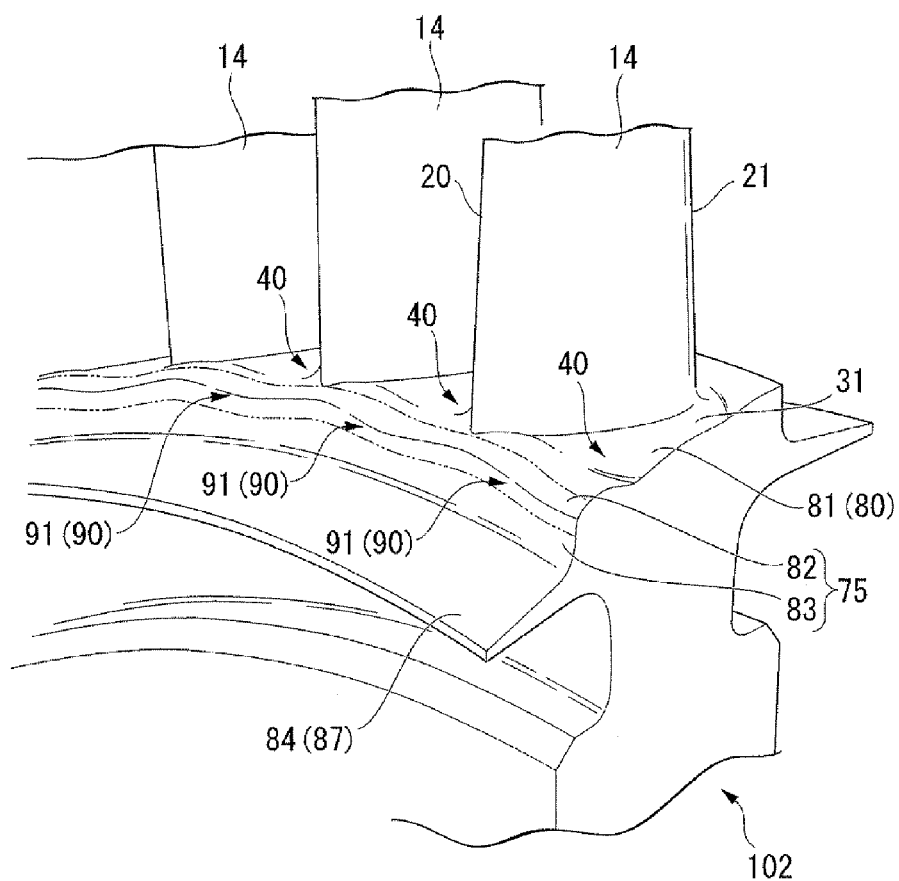
FIG. 4 is a partial perspective view showing the vicinity of the walls of a cascades of blades.
Figure 5:
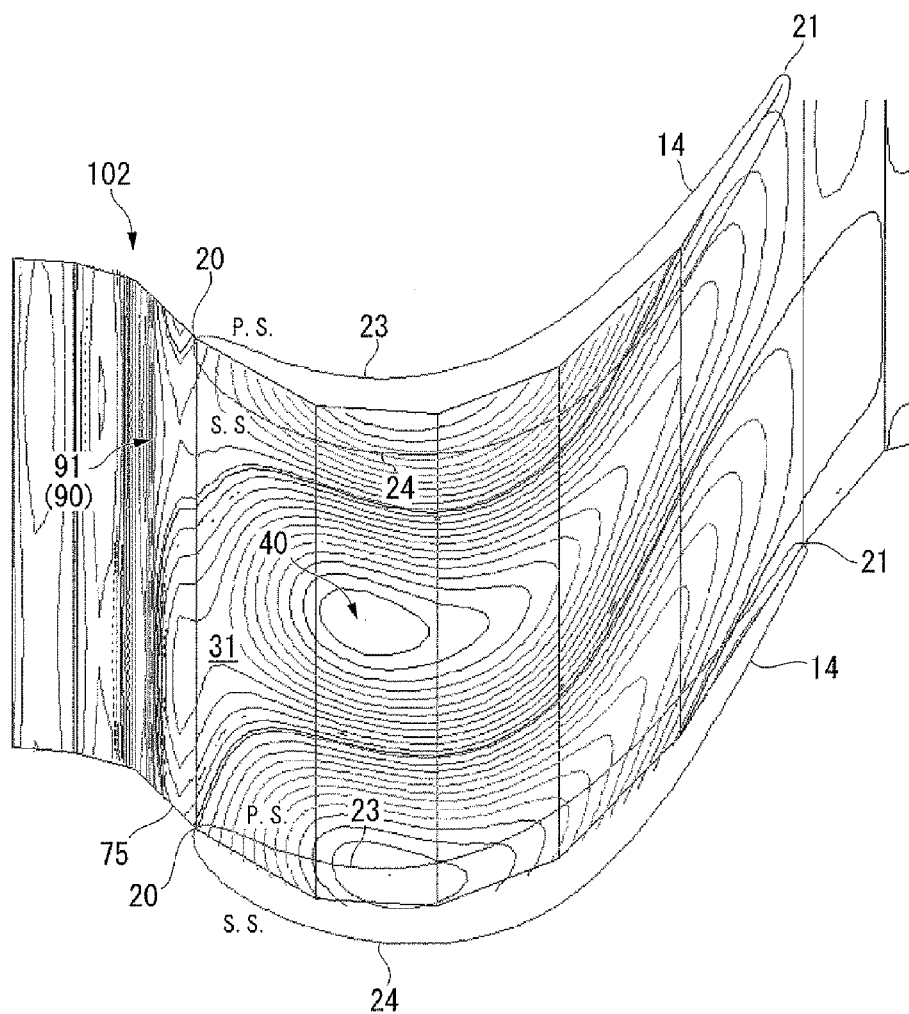
FIG. 5 is a view showing the height of the wall surface (radial positions, outline) using contour lines.
Figure 6:
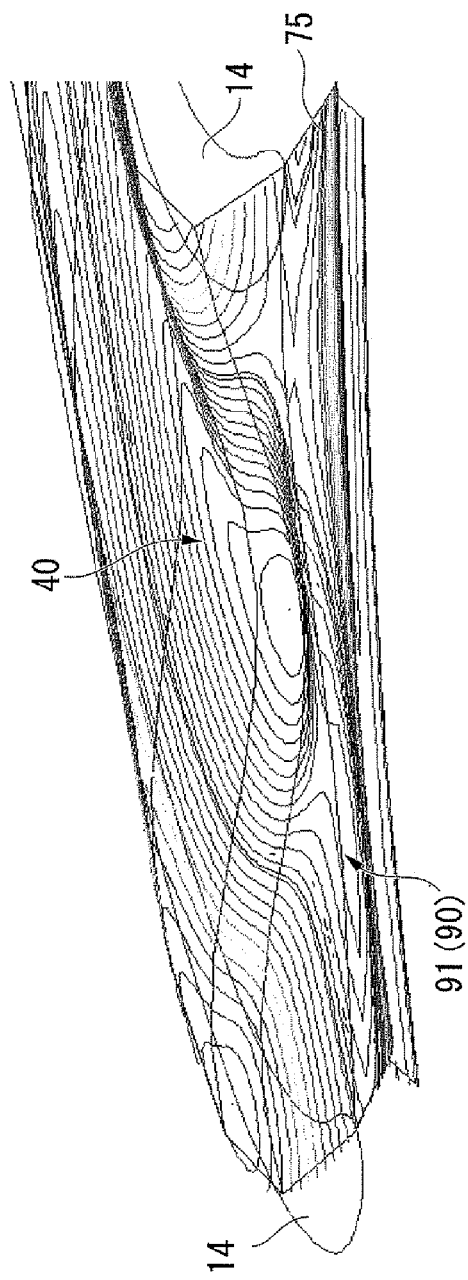
FIG. 6 is a diagram showing the height of the wall surface using contour lines.

FIG. 4 is a partial perspective view showing the vicinity of the wall of the cascade of blades 102. FIG. 5 and FIG. 6 show the height of the surface of the wall 31 (radial positions and outline) using contour lines.

As shown in FIG. 4, radial depressions 90 that have periodicity around the circumferential direction, are provided in the extension 75 of the wall 31. In the present embodiment, the depressions 90 have one depression part 91 for each blade pitch. The depression part 91 is provided on at least the second radial face 82 on the extension 75. The depression part 91 extends at least in the axial direction of the cascade of blades 102, and reaches to the axial outer edge (outside face 83) of the extension 75. Furthermore, the depression part 91 faces the passage 113 (refer to FIG. 2) between the cascade of blades 101 and the cascade of blades 102, and one part of the depression part 91 faces the clearance space 121 (refer to FIG. 2).

In another embodiment, the depression 90 can have two or more depression parts for each blade pitch. Furthermore, a form where the depression part 91 does not reach to the outer end of the extension 75, and/or a form where a part of the depression part 91 does not face the clearance space 121 (refer to FIG. 2) is also applicable.

As shown in FIG. 5 and FIG. 6, each blade 14 has; a leading edge 20, a trailing edge 21, a front surface (pressure surface (P.S.)) 23, a rear surface (suction surface (S.S.)) 24, and a bend that protrudes in the same circumferential direction as the cascade of blades 102. Due to the bend of the blades 14, the cross-section of the axial flow passage reduces from near the center of the blades 14 towards the trailing edge 21 of the blades 14.

In the present embodiment, the formative region of the depression part 91 on the extension 75 of the wall 31, in the forward region of the leading edge 20 of the blades 14, is between the leading edge 20 of the blades 14 and the outer end of the extension 75, along the axial direction of the cascade of blades 102. Furthermore, the circumferential center of the depression part 91 is to the back surface 24 side of the blades 14 with respect to the circumferential center between the blades 14.

In another embodiment, the circumferential center of the depression part 91 may be near the circumferential center between the blades 14, or may be to the front surface 23 side of the blades 14 with respect to the circumferential center between the blades 14. The shape of the central line of the depression part 91 (the extension line of the depression part 91) may be parallel with the axial direction of the cascade of blades 102, or may gradually approach the front surface 23 or the rear surface 24 of the blades 14 along the axial direction from the outer end of the extension 75. Alternatively, the shape of the central line of the depression part 91 (the extension line of the depression part 91) may have a bend.

According to the present embodiment, due to optimizing the longitudinal section shape of the front edge of the wall (platform) 31 of the cascade of blades 102, the turbulence in the flow of the working fluid from the gap between the walls of the adjacent cascade of blades to the passage between the blades 14 is suppressed. Moreover, due to optimizing the transverse section (section orthogonal to the axis) shape of the edge portion thereof, inflow turbulence is further suppressed.

The flow of the working fluid has a distribution having periodicity in the circumferential direction. In the present embodiment the depressions 90 provided in the extension 75 of the wall 31, as mentioned before, have periodicity around the circumferential direction. Based on the periodicity of the axial flow in the circumferential direction, the circumferential shape profile of the depression 90 can be determined. As a result, for example, for the circumferential distribution of the flow produced by the influence of the gap between the walls (influence of the cavity and the like), there is associated an optimum circumferential shape of the depression 90. By reducing the influence of the wall pair gap exerted on the flow of the working fluid, the loss in the flow from the clearance space 121 towards the passage 112 between the blades 14 of the cascade of blades 102 is suppressed. As a result, there is an improvement in the work efficiency of the blades 14.

Due to the depression part 91 reaching to the outer end (outside face 83) of the extension 75, and/or the depression part 91 facing the passage 113 (refer to FIG. 2) between the cascade of blades 101 and the cascade of blades 102, at least a part of the working fluid from the clearance space 121 (refer to FIG. 3) is favorably guided to the passage between the blades 14 via the depression part 91.

The depressions that suppress the turbulence in the flow from the axial gap of the wall pairs to the passage between the blades are not limited to being in the wall 31 on the root side of the blades 14 (rotor blades), and are also applicable to the wall 32 (the extension 76) on the tip side of the blades 14, the wall 35 (the extension 71) on the root side of the blades (stator blades) 19, and the wall 36 (the extension 72) on the tip side of the blades 19.

As shown in FIG. 4 to FIG. 6, in the present embodiment, in the radial wall 31 of the cascade of blades 102, in the regions between the blade 14 pairs, grooves 40 are formed. The grooves 40 extend at least in the axial direction of the cascade of blades 102.

In another embodiment, in the radial wall 31 of the cascade of blades 102, in the regions between the blade 14 pairs, grooves of another shape may be formed, or the grooves may not be formed.

Figure 7:
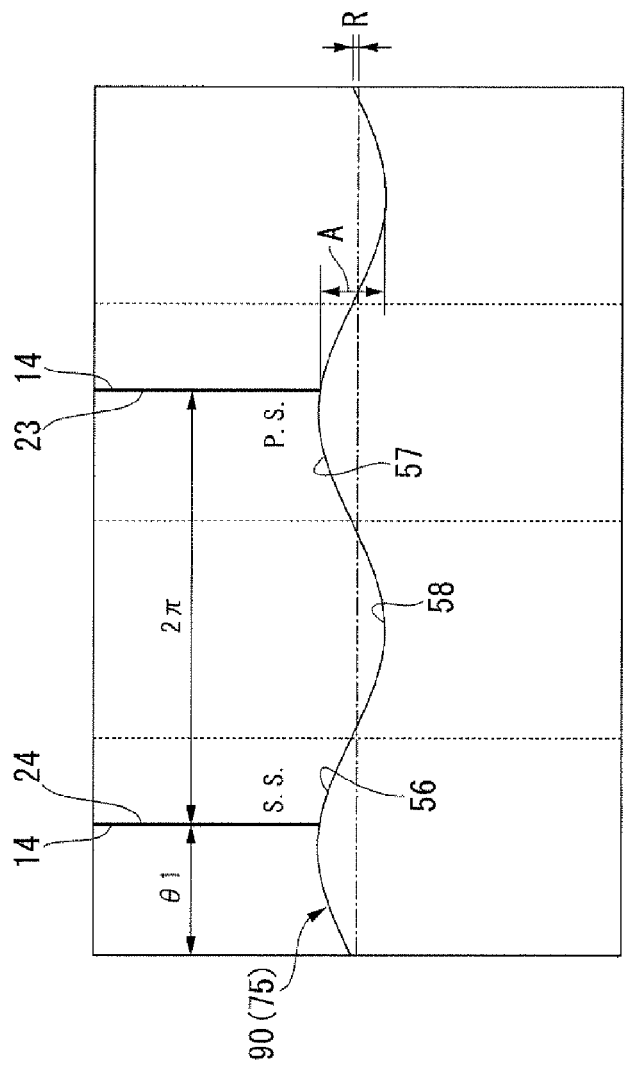
FIG. 7 is a diagram schematically showing a transverse section (circumferential outline) of an extension.

FIG. 7 is a diagram schematically showing a transverse section of the extension 75 (that is to say, the circumferential surface shape of the extension 75, or the circumferential outline of the depression 90). As shown in FIG. 7, the circumferential surface shape of the extension 75 (the circumferential outline of the depression 90) has a distribution of radial positions along the circumferential direction. That is to say, the shape of the surface (radial surface) of the extension 75 has a variety of radial positions that change along the circumferential direction. In other words, the surface of the extension 75 changes to any of; a position that is higher than a reference surface of the axial passage, a position that is approximately the same, and a position that is a lower. The distribution in the radial position has periodicity, with one period ($2\pi$) corresponding to one pitch of the blades 14. In the present embodiment, the circumferential surface shape (outline) of the extension 75 has a curvature that is defined using a sine curve for the circumferential direction.

An example of the method of defining the curve will be described below.

The curve that defines the circumferential outline of the extension 75, can be expressed using the following equation (1) for example. Here A is amplitude, $\theta 1$ is phase shift, and R is radial offset amount.

$$F(x) = A \sin(\theta + \theta 1) + R \qquad (1)$$

In the present embodiment, as shown in FIG. 7, the circumferential shape (circumferential outline) of the extension 75 includes a convex portion 56 adjacent to the rear surface 24 of the blades 14, a convex portion 57 adjacent to the front surface 23 of the blades 14, and a concave portion 58 formed between the two convex portions 56 and 57. The convex portion has a positive curvature, and the concave portion has a negative curvature.

In the present embodiment, as shown in FIG. 7, the minimum radius position in the circumferential shape of the extension 75 is on the rear surface 24 side of the blades 14 with respect to the circumferential center between the blades 14. In another embodiment, the minimum radius position can be near the circumferential center between the blades 14, or on the front surface 23 side with respect to the circumferential center between the blades 14.

The surface shape of the extension 75 is defined by a curve with a circumferential outline at each of the control point positions, and can be determined by connecting between the control points with a smooth curve face. Regarding the depression 90 of the extension 75 that is defined using this method, the fact that this contributes to improvement in the working efficiency can be analytically verified. Note that the curve that defines the circumferential outline of the extension 75 is not limited to a sine curve.

Figure 8:
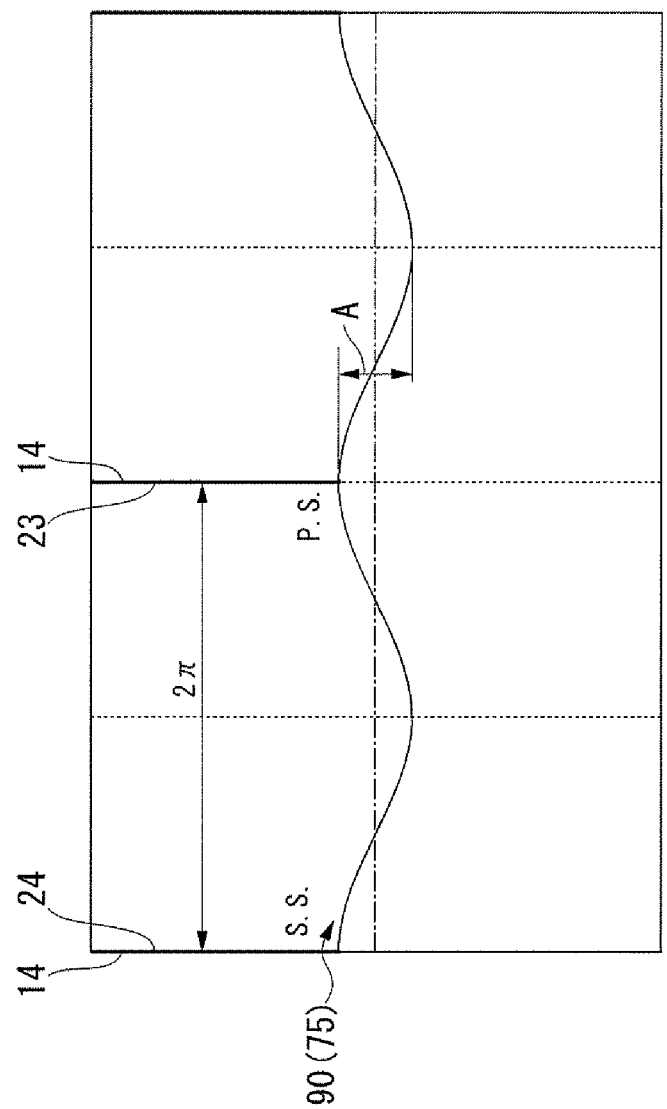
FIG. 8 is a diagram showing another transverse section of the extension.
Figure 9:
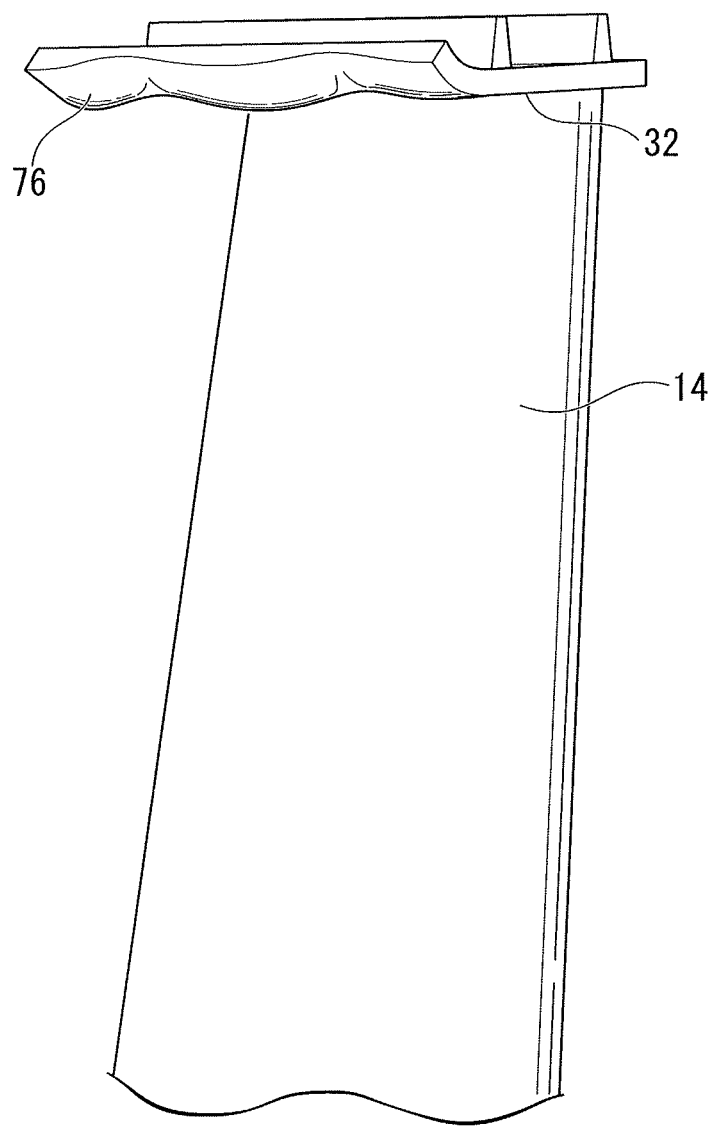
FIG. 9 discloses features of a turbo machine according to the present invention.
Figure 10:
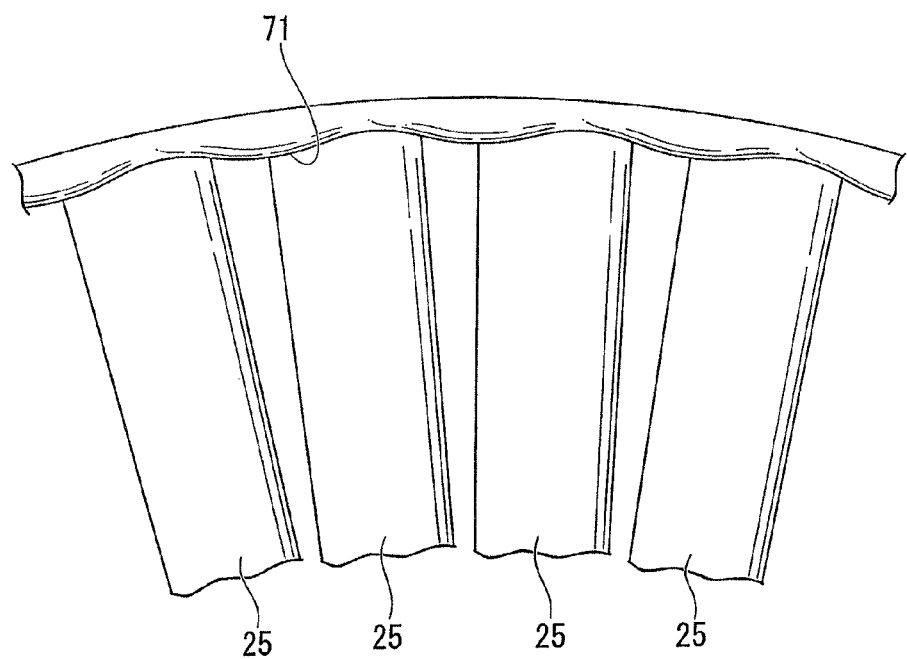
FIG. 10 discloses features of a turbo machine according to the present invention.
Figure 11:
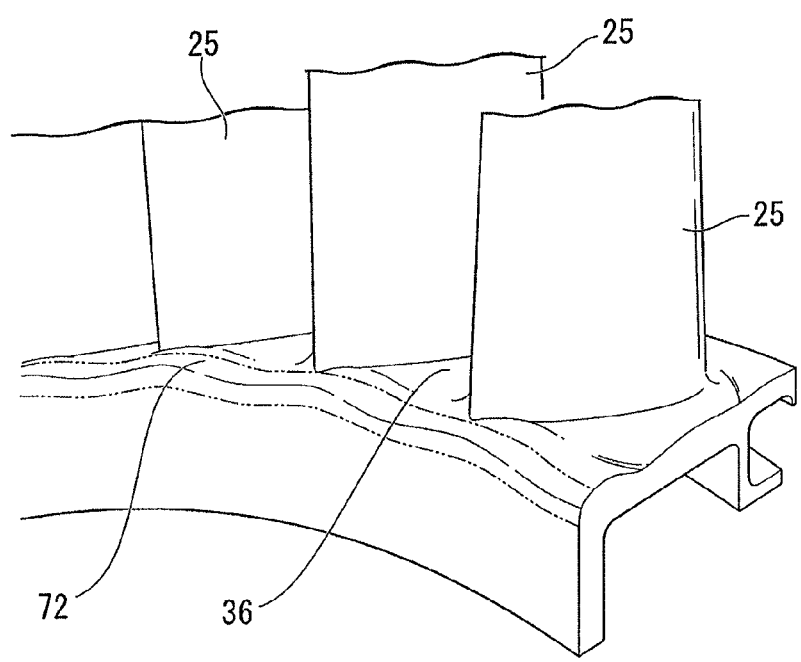
FIG. 11 discloses features of a turbo machine according to the present invention.
Figure 12:
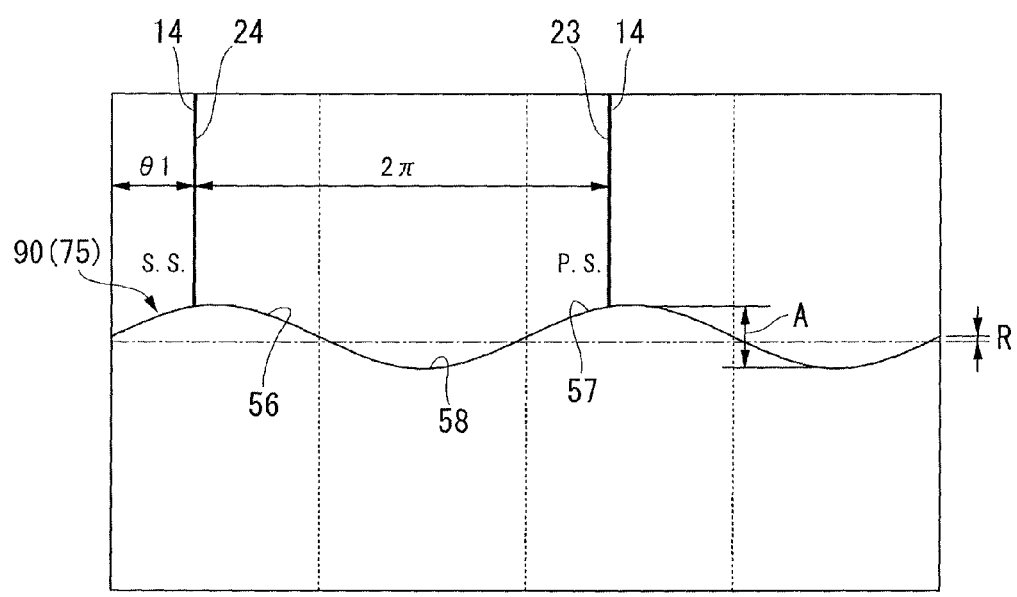
FIG. 12 illustrates an alternative location for the minimum radius position.

In another embodiment, as shown in FIG. 8, the circumferential outline of the extension 75 can be defined using a cosine curve. The curve can be expressed using the following equation (2) for example. Here A is the amplitude.

$$F(x)=A\cos\theta \qquad (2)$$

In FIG. 8, the circumferential outline of the extension 75 has a minimum radius position in the vicinity of the circumferential center between the blades 14.

The shape of the wall shown in FIG. 2 to FIG. 8 is an example, and the wall of the cascade of blades is suitably optimized corresponding to the blade profile and the flow field.

Preferred embodiments of the present invention have been described above. However the present invention is not limited to these embodiments. The numerical values used in the above description are but one example, and the present invention is not limited to these. Furthermore, configuration additions, omissions, substitutions, and other modifications are possible within the scope of the present invention. The present invention is not limited by the above description and is only limited by the claims.

INDUSTRIAL APPLICABILITY

According to the present invention, in a turbo machine having a stator cascade of blades and a rotor cascade of blades, loss due to disturbance of flow through the gap of axially adjacent walls can be reduced.

What is claimed is:

1. A wall of a turbo machine having a cascade of blades comprising:
    a first platform facing a first passage between blades in the cascade of blades; and
    a second platform facing a second passage between another adjacent cascade of blades on an upstream side and said cascade of blades on a downstream side, and having a circumferential outline having a distribution of radial positions, wherein
    the circumferential outline of said second platform has a minimum radius position near the circumferential center between said blades,
    said minimum radius position is on a front surface side or a rear surface side of said blades with respect to the circumferential center between said blades, and
    the circumferential outline has a curvature that is defined using one of a sine curve in the circumferential direction and a cosine curve in the circumferential direction.

2. A wall of a turbo machine according to claim 1, wherein the circumferential outline of said second platform includes a convex portion adjacent to a front surface of said blades, and a convex portion adjacent to a rear surface of said blades.

3. A wall of a turbo machine having a cascade of blades comprising:
    a first platform having a first radial face arranged between a leading edge and a trailing edge of the blades in the cascade of blades; and
    a second platform having a second radial face arranged between said blades of said cascade of blades and blades of another adjacent cascade of blades on an upstream side, and that cooperates with said first radial face of said first platform, and in which a circumferential shape of said second radial face has a distribution of radial positions, wherein
    the circumferential shape of said second radial face has a minimum radius position near the circumferential center between said blades,
    said minimum radius position is on a front surface side or a rear surface side of said blades with respect to the circumferential center between said blades, and
    the circumferential outline has a curvature that is defined using one of a sine curve in the circumferential direction and a cosine curve in the circumferential direction.

4. A wall of a turbo machine according to claim 3, wherein said second platform further has an outside face that cooperates with said second radial face, and faces in the axial direction.

5. A turbo machine comprising:
    a stator blade,
    a rotor blade,
    a wall on a root side of said stator blade,
    a wall on a tip side of said stator blade,
    a wall on a root side of said rotor blade,
    a wall on a tip side of said rotor blade,
    and at least one of said walls has a wall according to claim 1.

6. A turbo machine comprising:
    a stator blade,
    a rotor blade,
    a first wall on a tip side of said stator blade,
    a second wall on a tip side of said rotor blade,
    a third wall on a root side of said stator blade,
    a fourth wall on a root side of said rotor blade,
    an extension provided on said second wall, extending from a leading edge of said rotor blade towards a second clearance space between adjacent third wall and second wall, and having a radial depression, wherein
    a circumferential center of the depression is to the rear surface side of the blades or the front surface side of the blades with respect to the circumferential center between blades, and
    a circumferential outline of the extension has a curvature that is defined using one of a sine curve in the circumferential direction and a cosine curve in the circumferential direction.

7. A turbo machine comprising:
    a stator blade,
    a rotor blade,
    a first wall on a tip side of said stator blade,
    a second wall on a tip side of said rotor blade,
    a third wall on a root side of said stator blade,
    a fourth wall on a root side of said rotor blade,
    an extension provided on said fourth wall, extending from a leading edge of said rotor blade towards a first clearance space between adjacent first wall and fourth wall, and having a radial depression, wherein
    a circumferential center of the depression is to the rear surface side of the blades or the front surface side of the blades with respect to the circumferential center between blades, and a circumferential outline of the extension has a curvature that is defined using one of a sine curve in the circumferential direction and a cosine curve in the circumferential direction.

8. A turbo machine according to claim 6, wherein the radial depression has one depression component for each blade pitch.

9. A turbo machine according to claim 8, wherein part of said depression component faces a first clearance space or said second clearance space.

10. A turbo machine comprising:
- a stator blade,
- a rotor blade,
- a first wall on a tip side of said stator blade,
- a second wall on a tip side of said rotor blade,
- a third wall on a root side of said stator blade,
- a fourth wall on a root side of said rotor blade;
- an extension provided on said second wall, extending from a leading edge of said rotor blade towards a second clearance space between adjacent third wall and second wall, and having a depression that suppresses loss of flow between said second clearance space and a passage between blades, wherein
- a circumferential center of the depression is to the rear surface side of the blades or the front surface side of the blades with respect to the circumferential center between blades, and
- a circumferential outline of the extension has a curvature that is defined using one of a sine curve in the circumferential direction and a cosine curve in the circumferential direction.

11. A turbo machine comprising:
- a stator blade,
- a rotor blade,
- a first wall on a tip side of said stator blade,
- a second wall on a tip side of said rotor blade,
- a third wall on a root side of said stator blade,
- a fourth wall on a root side of said rotor blade;
- an extension provided on said fourth wall, extending from a leading edge of said rotor blade towards a first clearance space between adjacent first wall and fourth wall, and having a depression that suppresses loss of flow between said first clearance space and a passage between blades, wherein
- a circumferential center of the depression is to the rear surface side of the blades or the front surface side of the blades with respect to the circumferential center between blades, and
- a circumferential outline of the extension has a curvature that is defined using one of a sine curve in the circumferential direction and a cosine curve in the circumferential direction.

12. A wall of a turbo machine according to claim 1, wherein said distribution of radial positions has periodicity, with one period corresponding to one pitch of said blades.

13. A wall of a turbo machine according to claim 1, wherein a depression corresponding to said circumferential outline, and extending along at least the axial direction of said cascade of blades is provided in said second platform.

14. A wall of turbo machine according to claim 13, wherein said depression reaches to the axial outer edge in said second platform.

15. The turbo machine according to claim 7, wherein the radial depression has one depression component for each blade pitch.

* * * * *